J. STEPHENSON.

Car Axle-Box.

No. 8,087. Reissued Feb. 19, 1878.

*Witnesses:*

D. G. Stuart

A. McCallum

*Inventor:*

John Stephenson per L. Harway atty.

UNITED STATES PATENT OFFICE.

JOHN STEPHENSON, OF NEW YORK, N. Y.

IMPROVEMENT IN CAR-AXLE BOXES.

Specification forming part of Letters Patent No. 49,005, dated July 25, 1865; Reissue No. 8,087, dated February 19, 1878; application filed December 23, 1875.

DIVISION K[4].

*To all whom it may concern:*

Be it known that I, JOHN STEPHENSON, of New York, in the county of New York and State of New York, have invented certain new and useful Improvements in Car-Axle Boxes; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1:
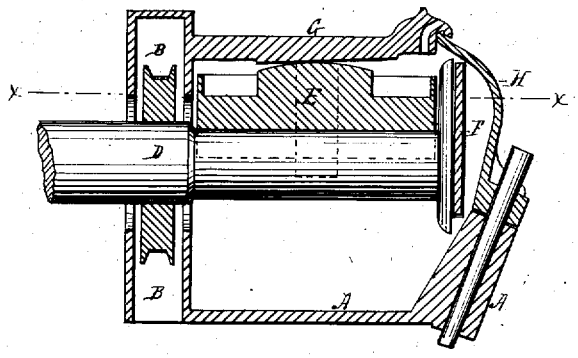
Figure 2:
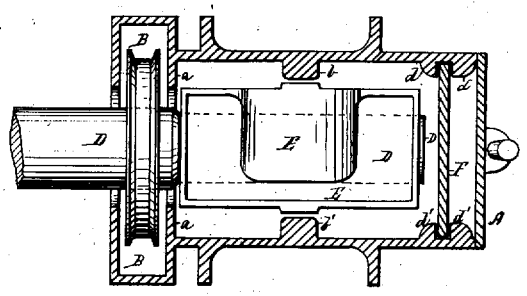

Figure 1 represents a vertical longitudinal section of a car-axle box to which my improvement has been applied; and Fig. 2, a horizontal longitudinal section of the same, taken through the line *x x* of Fig. 1.

In practice, the tendency of car-axles is to acquire end motion, causing many evils. This is unavoidable in the usual method of fitting up axles and boxes, because the small surfaces afforded by the shoulders of journals soon wear into the brasses and accelerate the troubles. This is especially true with street-railway cars, because their axles are of small diameter, sufficient only for the dimension of the journal.

My method of preventing the end play of axles is not to depend on the shoulders of the journals, but to locate at the end of the axle, within the box, a check-plate, properly secured, against which plate the thrusts of the axle are received.

The check is located between the end of the axle and the front wall of the box, and bears against the end of the axle and of the brass to check the thrusts of the former, and to confine the latter to its proper position in the box with respect to the journal.

The check-plate is formed of a plate of thin metal, of suitable form, the ends of which are lodged in grooves formed in the side walls of the axle-box at or near its front end, or by shoulders formed thereon for the same purpose.

In order to lift out the check-plate it is necessary that the roof of the axle be shortened, so as not to extend beyond the end of the axle, or thereabout. This permits the check-plate to be lifted vertically from its seat, and thus be removed from the box.

To prevent the check-plate from rising out of its proper position, I make the box lid or door to pass over the upper edge of the check-plate, so that the check cannot be removed without first displacing the door or lid of the box.

I claim as my invention—

1. The combination of a removable check-plate with a removable brass or bearing, and a car-axle box, provided with shoulders or grooves formed in its side walls, for the reception of the ends of the check-plate, substantially as described.

2. A car-axle box having located at the end of the axle a plate to check the end motion of the axle, each side edge of the plate resting in a groove, and prevented from rising out by the overhanging lid or door of the box.

3. A removable check-plate, in combination with a car-axle box provided with shoulders or grooves formed in its side walls for the reception of the ends of the check-plate, an axle-journal unprovided with a button or shoulder at its outer end, and a removable brass or bearing held in position by said check-plate, substantially as described.

4. A removable check-plate and a removable brass, in combination with a car-axle box provided with a shortened roof and door, substantially as and for the purpose set forth.

In testimony that I claim the foregoing I have hereunto set my hand this 7th day of December, 1875.

JOHN STEPHENSON.

Witnesses:

STUART A. STEPHENSON,
WILLIAM J. WALKER.